United States Patent
Chaudhry et al.

(10) Patent No.: US 9,445,055 B2
(45) Date of Patent: Sep. 13, 2016

(54) CONTRIBUTION AND ATTENDANCE FOR RECURRING MEETINGS

(71) Applicant: Cisco Technology, Inc., San Jose, CA (US)

(72) Inventors: Zaigham Riaz Chaudhry, Suzhou (CN); Edward Wang, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 14/298,231

(22) Filed: Jun. 6, 2014

(65) Prior Publication Data

US 2015/0358586 A1    Dec. 10, 2015

(51) Int. Cl.
*H04N 7/14* (2006.01)
*H04N 7/15* (2006.01)

(52) U.S. Cl.
CPC .............. *H04N 7/155* (2013.01); *H04N 7/147* (2013.01)

(58) Field of Classification Search
CPC ................................ H04N 7/152; H04N 7/15
USPC ................ 348/14.08, 14.09, 211.12, E7.083; 379/93.21, 158, 202.01, 205.01
See application file for complete search history.

(56) References Cited

U.S. PATENT DOCUMENTS

| | | | |
|---|---|---|---|
| 2004/0141605 A1* | 7/2004 | Chen | H04M 3/42221 379/202.01 |
| 2006/0195354 A1* | 8/2006 | Borovoy | G06Q 10/06398 705/7.19 |
| 2013/0263020 A1 | 10/2013 | Heiferman et al. | |
| 2013/0294594 A1 | 11/2013 | Chervets et al. | |
| 2013/0317873 A1 | 11/2013 | Kozloski et al. | |

OTHER PUBLICATIONS

Microsoft Office Live Meeting user Guide, accessed Apr. 2, 2014; 73 pages.*
Managing Meeting Attendance Quick Reference Card, accesed Apr. 2, 2014, Pearson, www.chesterfield.k12.sc.us/infotech_staff/PowerSchool%20Managing%20Meeting%20Attendance.pdf.
Microsoft Office Live Meeting User Guide, accessed Apr. 2, 2014, Microsoft, www.meetingconnect.net/files/LiveMeetingUserGuide.pdf.

* cited by examiner

*Primary Examiner* — Yosef K Laekemariam
(74) *Attorney, Agent, or Firm* — Lempia Summerfield Katz LLC (57) ABSTRACT

In one implementation, a periodic teleconference for multiple participant endpoints is established. The periodic teleconference occurs on multiple dates or multiple times. A network device may identify an attendance of the multiple participant endpoints for the periodic teleconference includes and contributions of the multiple participant endpoints for the periodic teleconference. The network device generates a summary of the periodic teleconference including data indicative of the attendance of the multiple participant endpoints and the contributions of the multiple of participant endpoints.

19 Claims, 9 Drawing Sheets

| PARTICIPANT | INVITEE ID | MEETING ID | DATE TIME | ABSENCE STATUS |
|---|---|---|---|---|
| A | 001 | A1 | 02.02.14:1315 | 0.3 |
| B | 002 | A1 | 02.02.14:1315 | 0.3 |
| C | 003 | A1 | 02.02.14:1315 | 0.6 |
| D | 004 | A1 | 02.02.14:1315 | 0.6 |
| E | 005 | A1 | 02.02.14:1315 | 1.0 |
| F | 006 | A1 | 02.02.14:1315 | 1.0 |
| G | 007 | A1 | 02.02.14:1315 | 0.0 |

FIG. 5A

| MEETING: A1 | | PARTICIPANT: A |
|---|---|---|
| JOIN TIMES | LEAVE TIMES | CONTRIBUTION SCORE |
| 02.02.14:1300 | 02.02.14:1315 | 3 |
| 02.02.14:1324 | 02.02.14:1325 | 0 |
| 02.02.14:1330 | 02.02.14:1350 | 10 |
| 02.02.14:1400 | 02.02.14:1410 | 5 |
|  |  |  |
|  |  |  |
| TOTAL CONTRIBUTION SCORE | | 18 |

CONTRIBUTION AND ATTENDANCE FOR RECURRING MEETINGS

TECHNICAL FIELD

This disclosure relates in general to the field of meetings, and more particularly, to a meeting service that maintains detailed attendance and/or contribution information for a meeting or across a series of recurring meetings.

BACKGROUND

A web hosted meeting service may allow parties in different locations to participate in a common, virtual meeting. The web hosted meeting service issues invitations to a list of parties that may participate in the virtual meeting. Invitations, which may be sent through email, include information for recipients to join the meeting at a designated time at which the meeting is scheduled to begin. Some hosted meetings include file sharing, video, or desktop sharing. Web hosted meeting services may include calendars or interact with other calendaring programs. The invitation email that invites a recipient to join a meeting may include information that enables the meeting to be added to a calendar of the recipient.

Periodic meetings, which may be referred to as recurring meetings, may be managed by the web hosted meeting service. Companies may hold weekly team meetings. Scrum meetings or other types of project meetings may repeat on a periodic basis. Web hosted meeting services may allow periodic meetings to be scheduled automatically (e.g., daily, weekly, monthly or other intervals). However, web hosted meeting services do not collect data on the content across the series of meetings.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, an apparatus includes a memory configured to store data describing a periodic teleconference for a plurality of participant endpoints on multiple dates and a processor configured to identify contributions of at least one of the plurality of participant endpoints from the data describing the periodic teleconference on multiple dates and calculate a contribution score across multiple instances of the periodic meeting for the at least one of the plurality of participant endpoints.

Example Embodiments

Periodic meetings or recurring meetings may occur at specified intervals (e.g., every 10 days) or at the same time weekly or monthly (e.g., 2 P.M. on Tuesdays). Periodic meetings may be used for online classrooms and training, online scrum meetings, and weekly project status meetings. The periodic meetings may be scheduled automatically by meeting hosting software at the specified intervals.

The invitee list for periodic meetings may be the same across multiple occurrences of the meeting. Attendance during the meeting may be displayed to all participants because any participant can see the list of participants. In addition, contributions may be evident as the meeting occurs. That is, participant X can see that participant Y is contributing because the contribution is visible on the screen or audible.

The following embodiments describe systems for maintaining attendance and contribution records for a single meeting or the series of periodic meetings. The attendance record lists the instances of the periodic meeting were attended and the instances of the periodic meeting were not attended by each of the participants on the invitee list. The contribution record lists the contributions for the instances of the periodic meeting for the participants on the invitee list.

Figure 1:
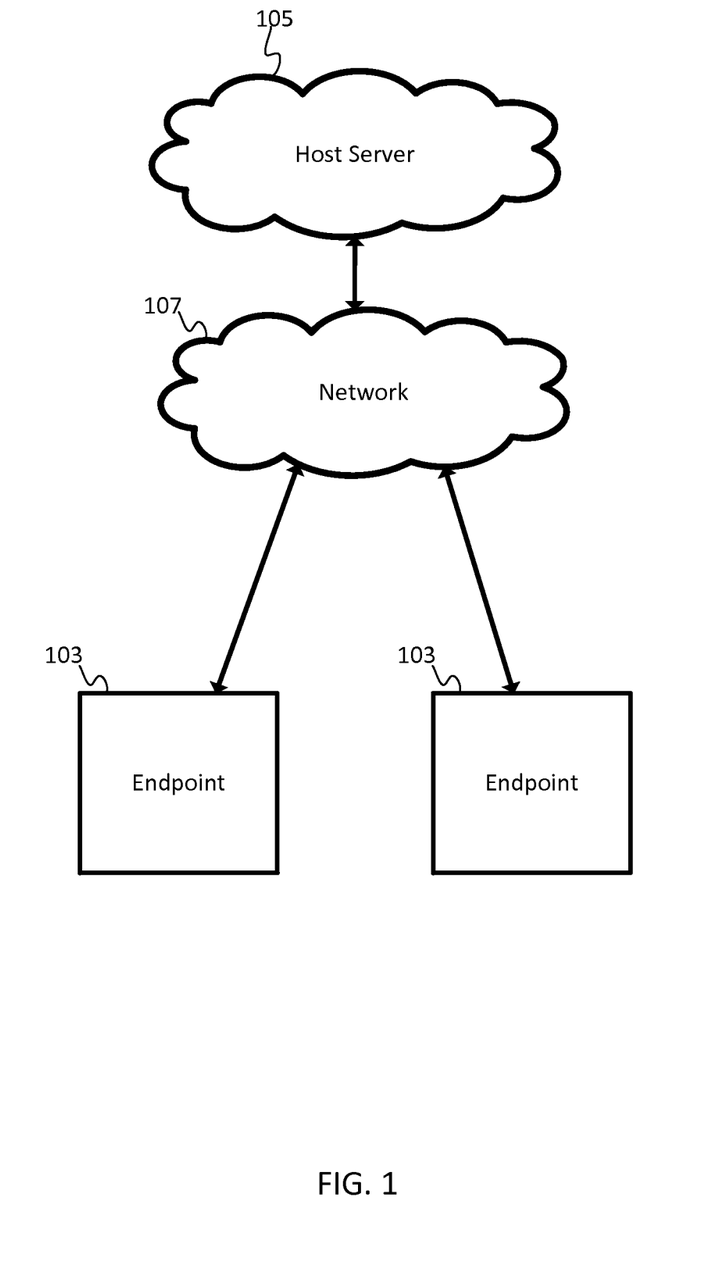
FIG. 1 illustrates an example system for attendance and contribution for periodic meetings.

FIG. 1 illustrates an example system for attendance and contribution for periodic meetings. The system includes at least two endpoints 103 and a host server 105 coupled via the network 107 (e.g., the Internet). Additional, different, or fewer devices may be included in the system. Each of the endpoint 103 and the host server 105 may include a memory and a processor to perform the following examples. The phrase "coupled" is defined to mean directly connected to or indirectly connected through one or more intermediate components. Such intermediate components may include hardware and/or software-based components.

A periodic teleconference may be set up at a specific time on multiple dates. The specific time may be daily at a time (e.g., every day at 9 A.M.), weekly on a specific day (e.g., Mondays at 8 A.M.), or monthly on a specific day (e.g., first Tuesday of the month at noon). Other patterns, including irregular patterns (e.g., different times on different dates) may be used for the periodic teleconference. The periodic teleconference may be associated with a list of invitees (e.g., endpoints 103). Any number of invitees may be possible. Invitees may be added or removed from the list of invitees.

In one example, the periodic teleconference may be semi-public in which endpoints can add themselves to the list of invitees. In another example, one of the endpoints 103 is designated as the meeting administrator and defines the list of invitees. Initially, the administrator sends a meeting request to the host server 105 to establish the periodic teleconference.

The host server 105 may identify the periodic teleconference for the list of invitees (e.g., endpoints 103). Endpoints 103 from the list of invitees that join the current instance of the periodic teleconference become participant endpoints. An endpoint 103 may join the periodic teleconference by selecting a uniform resource locator (URL) issued by the host server 105. An endpoint 103 may join the periodic teleconference using a standalone application executed by the endpoint 103.

The host server 105 may identify attendance for the periodic teleconference. The attendance may be the number of participant endpoints that have joined the periodic teleconference. The attendance may be the number of participant endpoints divided by the number of endpoints on the list of invitees. The attendance may be based on participant endpoints that were joined for the complete duration of the teleconference, for a predetermined portion of the teleconference, or any portion of the teleconference. The host server 105 may store the attendance of the current teleconference, in addition with previous attendance of the periodic teleconference, in memory.

The host server 105 may identify contributions of at least one of the plurality of participant endpoints for the periodic teleconference on multiple dates. The contributions may include speaking, sharing materials, or sending text messages. The contributions may be assigned scores based on the type of contribution and the duration of the contribution.

The host server 105 may be configured to generate a summary of the periodic teleconference including data indicative of the attendance of participant endpoints and the contributions of the participant endpoints. The host server 105 is configured to send the summary of the periodic teleconference to an administrator of the periodic teleconference.

In another example, the host server 105 may identify contribution for a single meeting for the plurality of participant endpoints. The host server 105 may generate a summary of the single meeting that includes the attendance of the participant endpoints and individual contributions made by the endpoints including the type of contribution and the duration of the contribution.

The endpoints 103 may be any type of computing device such as a personal computer, a smart phone, a mobile phone, a personal digital assistant ("PDA"), a tablet computer, a notebook computer, a navigation device, and/or any other known or later developed portable or mobile computing device operable to participate in online meetings.

Figure 2:
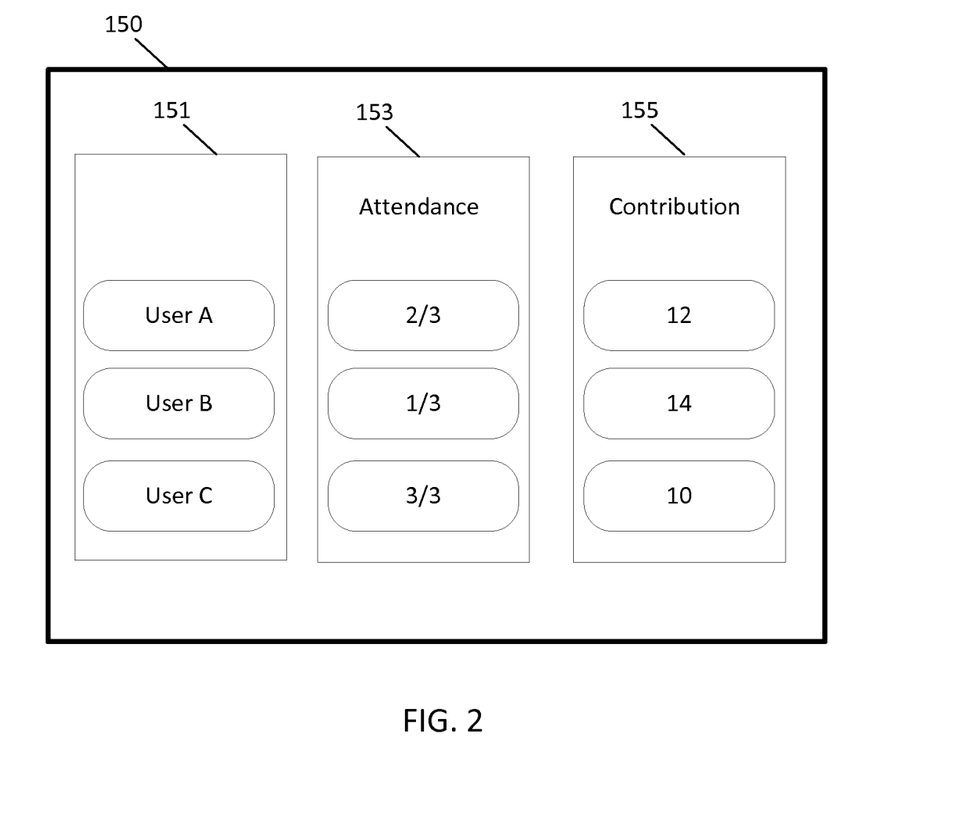
FIGS. 2-4 illustrates example interfaces for attendance and contribution information.

FIG. 2 illustrates an example interface 150 for attendance and contribution information. The interface 150 includes a summary of the periodic teleconference including data indicative of the attendance participant endpoints and the contributions of the participant endpoints. The summary may be accessed from the online meeting. Alternatively, the summary may be requested from the server 105 by one or more endpoints 103. The interface 150 may include a user portion 151 that lists the invitees to the periodic meeting or the invitees that have attended at least one instance of the periodic meeting. The user portion 151 may include any combination of the names, usernames, physical locations, or internet protocol (IP) addresses.

The interface 150 may include an attendance portion 153 that presents the attendance record for each of the invitees. The attendance portion 153 may include the number of instances of the periodic meeting attended by each user and the total number of instances of the periodic meeting (e.g., 2/3). The attendance portion 153 may include an attendance score. The attendance score may be a percentage (e.g., 2/3=67%) of attended meetings or a scalar quantity of the number of attended meetings (e.g., 2). The summary of the periodic teleconference may include a check mark to denote an attendance and a cross icon to denote an absence.

The server 105 may compare the list of invitees to the actual participant endpoints that were present at that the meeting for each instance of the periodic meeting after the meeting occurs. The server 105 may accumulate these attendance records and calculate the cumulative attendance shown in the attendance portion 153. Upon request, the server 105 may generate and send the attendance history of every invitee across all occurrences of the periodic meeting.

The interface 150 may include a contribution portion 155 that presents the contributions may for each of the invitees or participants. The contribution portion 155 may include a confidence score for the participants. The server 105 may identify contributions of the participant endpoints based on data received as part of the meeting. Example types of contributions may include text messages, raising hand, poll participation, speech, moderating and desktop sharing. Each type of contribution may be assigned a weight. The contribution portion 155 may be applied to a single meeting occurrence.

Speech may be weighted as one or unity. Minor contributions may be weighted less than speech. Minor contributions may include text messages (e.g., weighted as 0.5), raising hand (e.g., weighted as 0.8), and poll participation (e.g., weighted as 0.3). Text message may be messages send to individuals or all participants during the meeting. Text messages may include supplemental material or URLs. The contribution of hand raising may include a request to speak or otherwise contribute to the meeting. The hand raising may be scored as a contribution even if the request to contribute is not granted. Poll participation may be submitting data to a participant poll in the meeting.

Major contributions may be weighted more than speech. Major contributions may include desktop sharing (e.g., weighted as 2.0) or moderating the meeting (e.g., weighted as 1.5). Desktop sharing may include sharing documents, web browsers, or other applications to the participants in the meeting. Moderating the meeting may include being in control of the meeting. In some examples, the moderator is signified by a ball or other indicia.

The host server 105 may calculate the contribution based on any combination of the speech weight, the minor contribution weight, and the major contribution weight. In one example, a time interval is used to designate when a contribution has been satisfied. For example, 1 minute of speech may correspond to the speech weight. Thus, a participant's confidence score is increased by 1 for every minute of speech. Likewise, a participant's confidence score may be increased by 1 for every minute of desktop sharing. A different time interval may be associated with different types of contributions. Some contributions may have no corresponding time interval. For example, each occurrence of a text message, hand raise, or poll submission may be assigned the corresponding weight for the contribution score.

In one example, the first occurrence of the contribution is assigned the full weights and subsequent contributions of the same time are assigned a lower weight. In one example, the nth subsequent occurrence of a contribution is assigned a weight ($W_n$) according to Equation 1.

$$W_n = W * X^n \qquad \text{Eq. 1}$$

W is the original weight, and X is a scaling factor. For example, when the original weight (W) for speech is 1.0 and the scaling factor (X) is 0.9, the first subsequent occurrence may contribute 0.90 to the contribution score, the second subsequent occurrence may contribute 0.81 to the contribution score, and the third subsequent occurrence may contribute 0.73 to the contribution score.

Equation 1 may be used for multiple types of contributions, which are summed to calculate the total contribution score. The total contribution score may be based on contributions across multiple instances of the periodic meeting. The contributions from different dates may be summed or averaged. The server 105 is configured to update the summary of the periodic teleconference based on the total contribution score for each participant.

The server 105 may generate messages based on the confidence scores. In one example, server 105 sends a message including the confidence scores for each meeting, or cumulative scores for the series of periodic meetings to the moderator or instructor for the periodic meeting. In another example, the server 105 may generate a warning message based for a participant endpoint when the contribution score for that participant endpoint is less than a contribution threshold. In a classroom setting, participants with a low contribution score may be docked or subtracted points toward the grade for the course.

Figure 3:
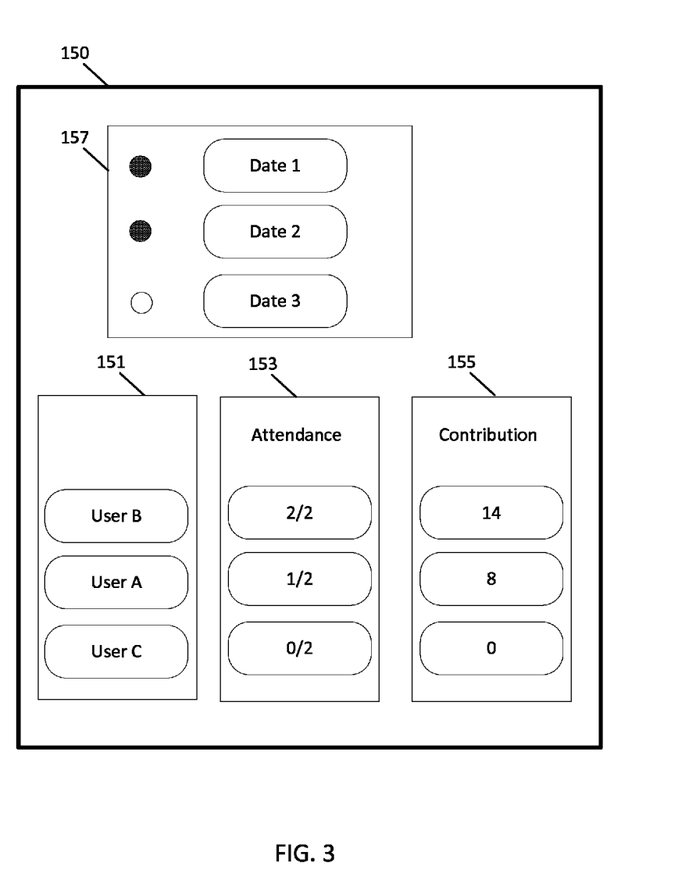

FIG. 3 illustrates another example interface 150 for attendance and contribution information. In addition to the user portion 151, the attendance portion 153, and the contribution portion 155, the interface 150 may include a meeting occurrence portion 157. The meeting occurrence portion 157 may show completed meetings or all instances of the periodic meeting. The data shown in the interface 150 may be adjusted based on dates selected in the meeting occurrence portion 157. For example, when Date 1 is selected, the user portion 151, the attendance portion 153, and the contribution portion 155 may show data relevant to Date 1, and when both Date 1 and Date 2 are selected, the user portion 151, the attendance portion 153, and the contribution portion 155 may show cumulative data for both Date 1 and Date 2.

The server 105 may be configured to rank the users according to attendance or contribution. The server 105 may compare relative attendances of the participants or relative contributions scores for the participants and order the participants on the summary of the periodic teleconference according to the comparison.

The ranking may be across all instances of the periodic meeting or based on a subset of the periodic meetings. For example, as shown in FIG. 3, when Date 1 and Date 2 are selected, User B may be ranked ahead of User A because of greater attendance and or greater contribution scores.

The server 105 may be configured to assign permissions for access to the attendance or contribution data. In one example, any participant endpoint 103 may request the attendance data or the contribution data and receive the requested data from the server 105. In another example, only the administrator or moderator of the periodic meeting is given access to the attendance data or the contribution data. In one example, participants are given access only to their own data.

The server 105 may store an access key that defines access for the attendance data or the contribution data. The access key may list names, usernames, or IP addresses along with access levels. Example access levels include all access, contribution data only, and attendance data only. Upon receiving a request for data, the server 105 may query the access log to determine whether the request should be sent the requested data.

In one example, the access key includes data to allow any invitee to view every invitee's attendance history for all or any past occurrences. Furthermore, the system may allow any invitee to view every invitee's joining and leaving time for all or any past occurrences. Such a system allows anyone to observe/monitor the participation level of each attendee in any particular session of the periodic meeting.

In one example, during each occurrence of the periodic meeting, the attendance history of each invitee is made transparently visible next to each invitee's name in invitee list so that any participant can see the attendance history for every other participant. Thus, letting irregular invitees may realize that their absence is being noted down so they should be more careful to join the meetings.

Based on product requirements and implementation details, some privacy policy may be added to the system through the access key which non-administrator participants can be restricted or allowed to view contributions and attendance history of other participants. In one example, only the participants of specific meetings may be allowed to view attendance history of other participants in the same meeting.

Figure 4:
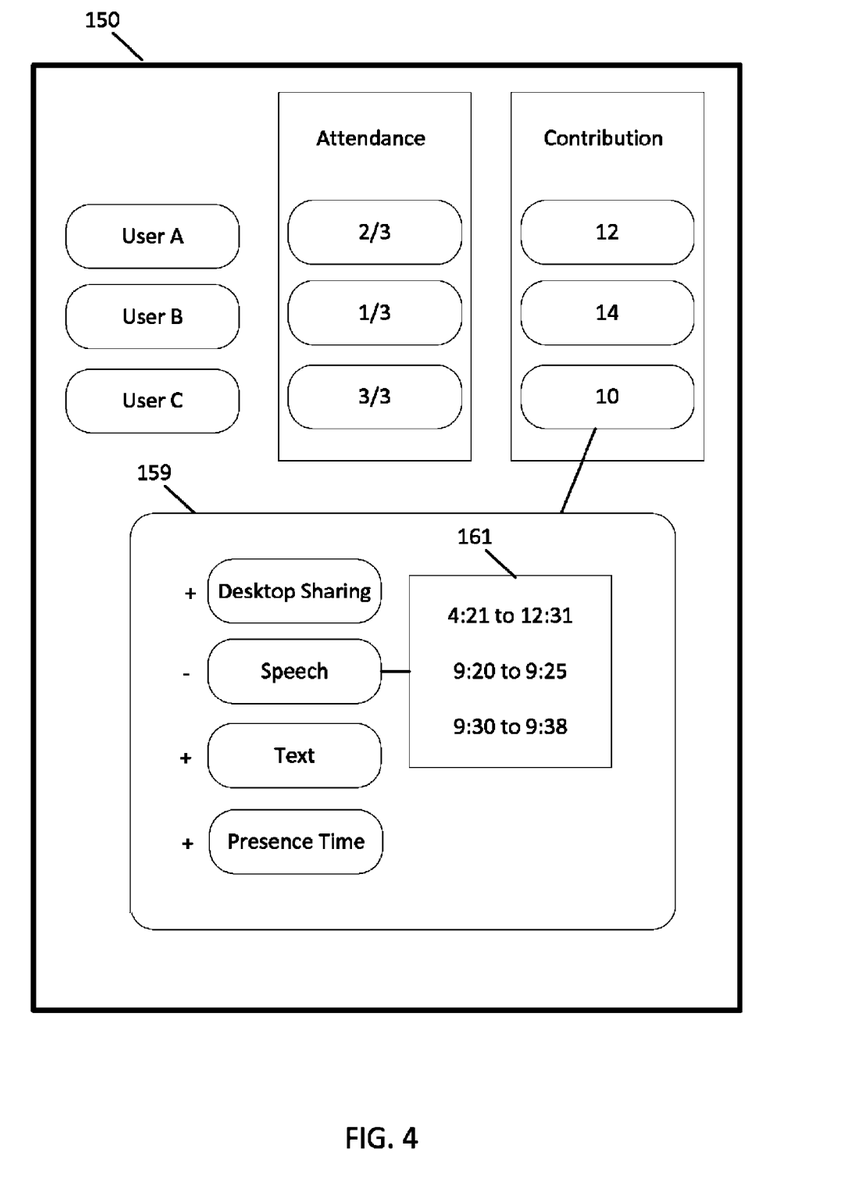

FIG. 4 illustrates another example interface 150 for attendance and contribution information. In addition to the user portion 151, the attendance portion 153, and the contribution portion 155, the interface 150 may include contribution details 159. The contribution details 159 may describe the type of contribution (e.g., speech, desktop sharing, text messages, raising hand, and/or poll participation). An icon representing the type of contribution may be expanded to display time intervals 161. The time intervals 161 may include underlined text in blue or another type of clickable link to open a corresponding meeting recording at the corresponding time intervals. The time intervals 161 display how many times and when a participant joins and leaves an online meeting. The contribution details 159 may be presented by interface 150 for a single meeting instance without reference to the recurring meetings.

Figure 5A:
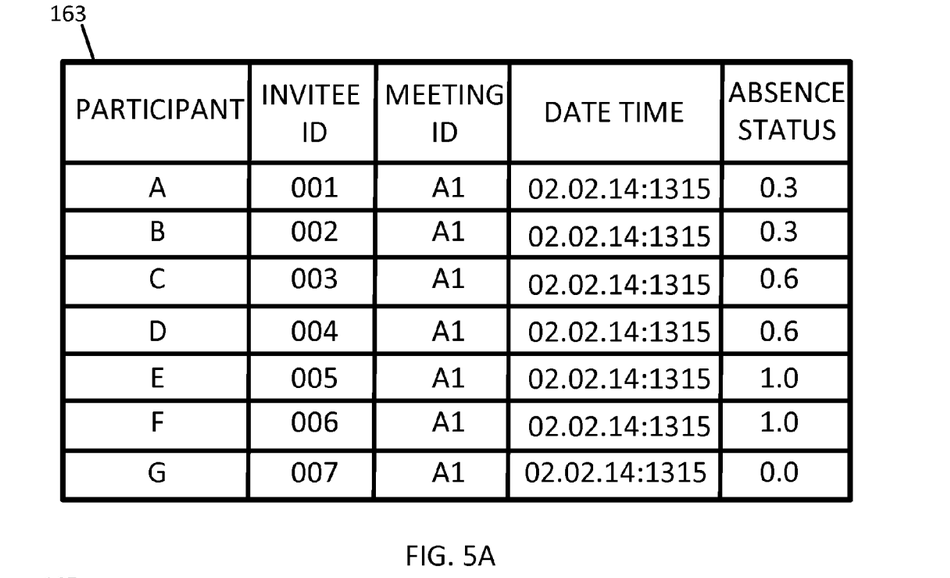
FIG. 5A illustrates an example attendance table.

FIG. 5A illustrates an example attendance table 163. The attendance table 163 may be stored at the server 105 or individual endpoints 103. The attendance table 163 includes a participant label, an invitee identification (ID), a meeting ID, a date and time, and an absence status. The absence status may be calculated based on the amount of time that the corresponding participant spends in the meeting. The absence status may represent the percentage of the total time that the corresponding participant attended the meeting. The absence status may be based on more than one time interval of attendance. That is, multiple join times and leave times may be used to calculate the absence status for one occurrence of the periodic teleconference.

In one example, the absence status may be binary. When an invitee joins or leaves the meeting, the corresponding attendance record is stored in the attendance table 163 by setting the absence status to false. If some of the invitees do not join, the corresponding absence statuses are marked to true. The server 105 may pass each the attendance history to endpoint 103 when requested. For example, when a new occurrence of the periodic meeting starts, the server 105 may send the attendance history for display next to each invitee's name. To provide further details, such as joining/leaving time of an invitee and total absence count since the beginning of recurring meeting history, a link may be provided.

The server 105 may be configured to change the invitee list based on the absence status. After a predetermined number of periodic meetings have been held, or after each periodic meeting is held, the server 105 may compare the absence status of each participant to a threshold value. For each participant whose absence status does not exceed the threshold value, the server 105 may generate a warning message. In another example, for each participant whose absence status does not exceed the threshold value, the server 105 may remove the participant from the invitee list. In other examples, invitees that do not attend a certain percentage of the meetings or a certain percentage of a meeting may not be invited to future occurrences of the periodic meeting.

Figure 5B:
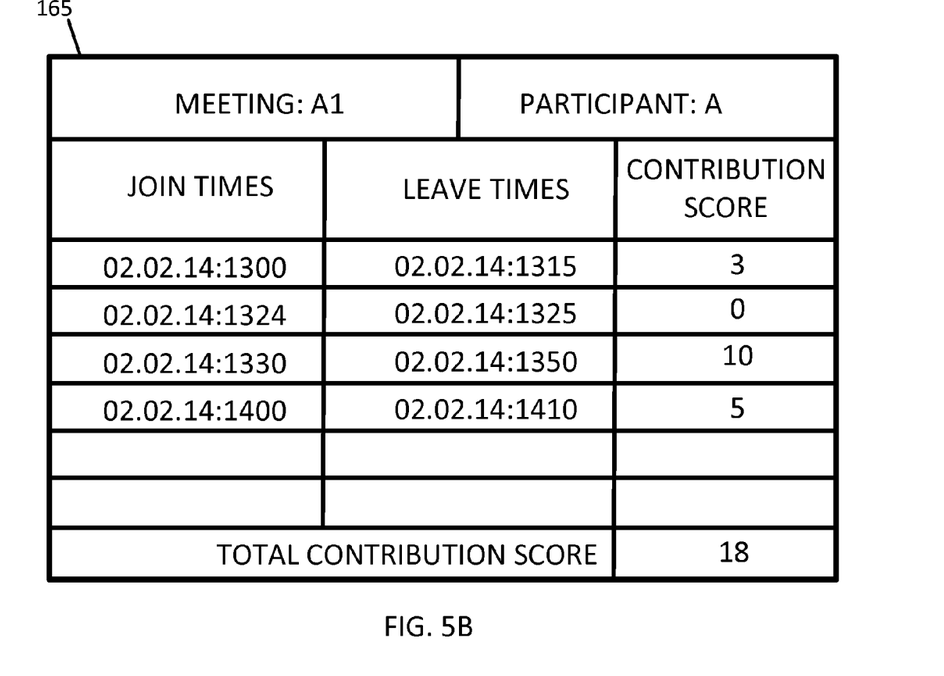
FIG. 5B illustrates an example contribution table.

FIG. 5B illustrates an example contribution table 165. The contribution table 165 may be linked to attendance table 163. Either table may include a communication address for an administrator of the periodic meeting. The contribution table 165 may be associated with a meeting ID and a participant ID. Different contribution tables may be included for different meeting ID and participant ID pairs. The contribution table 165 is configured to track multiple join times and leave times for a single participant and an instance of the periodic meeting.

The contribution table 165 includes join time data and leave times for each time interval that a participant attended the meeting. The contribution table 165 may include a contribution score, calculated according to the example algorithms described herein, for each of the time intervals. The contribution 165 may include a total contribution score based on the contribution scores for the time intervals. The total contribution score may be a sum or average of the individual contribution scores. The total contribution score may be calculated by the server 105.

The server 105 may be configured to compare the total contribution scores for one or more of the participant endpoints to a threshold value. If any of the total contribution scores are below the threshold, the server 105 may issue a warning to the participant to increase contribution. In another example, if any of the total contribution scores are below the threshold, the server 105 may remove the corresponding participant from the invitee list. In other words, when an invitee does not contribute a threshold amount to the periodic meeting, the server 105 removes the invitee from future instances of the periodic meeting. In one example, a student of a course is automatically removed from the course when a baseline level of contribution is not put forth by the student.

The server 105 may be configured to calculate interest levels based on the contribution table and/or the attendance table 163. The server 105 may analyze the attendance information or contribution information to identify when participants leave or join the periodic meeting. The server 105 may identify the subject matter at those times that participants are showing an interest in.

Figure 6:
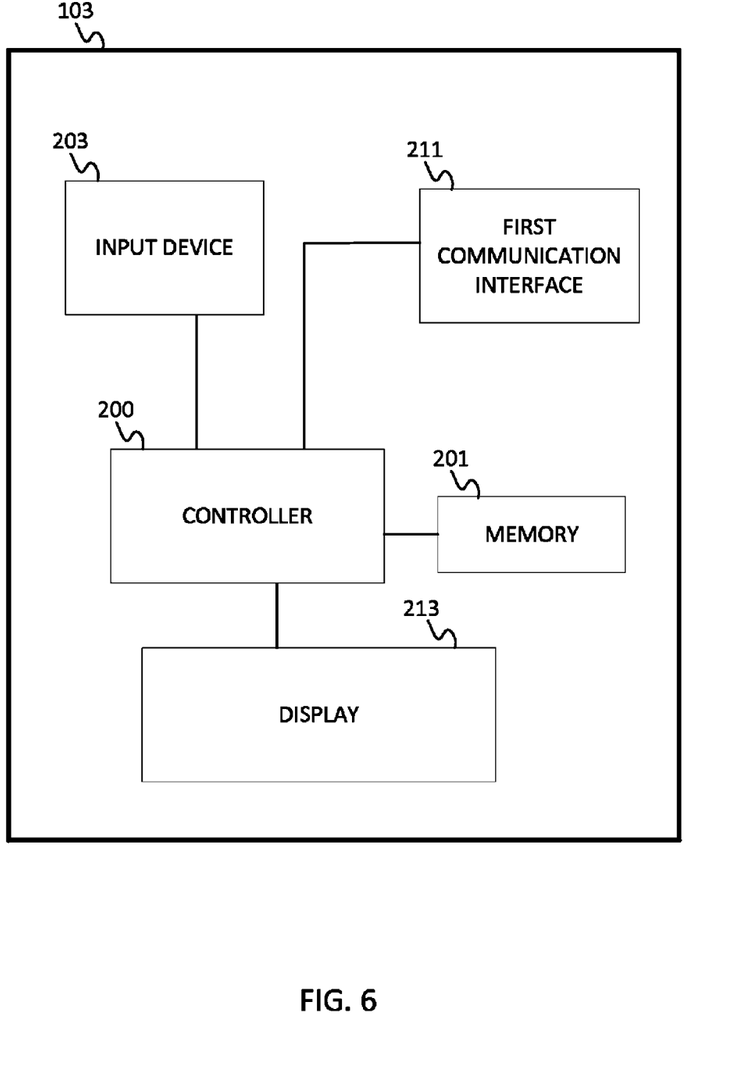
FIG. 6 illustrates an example endpoint device for the system of FIG. 1.
Figure 7:
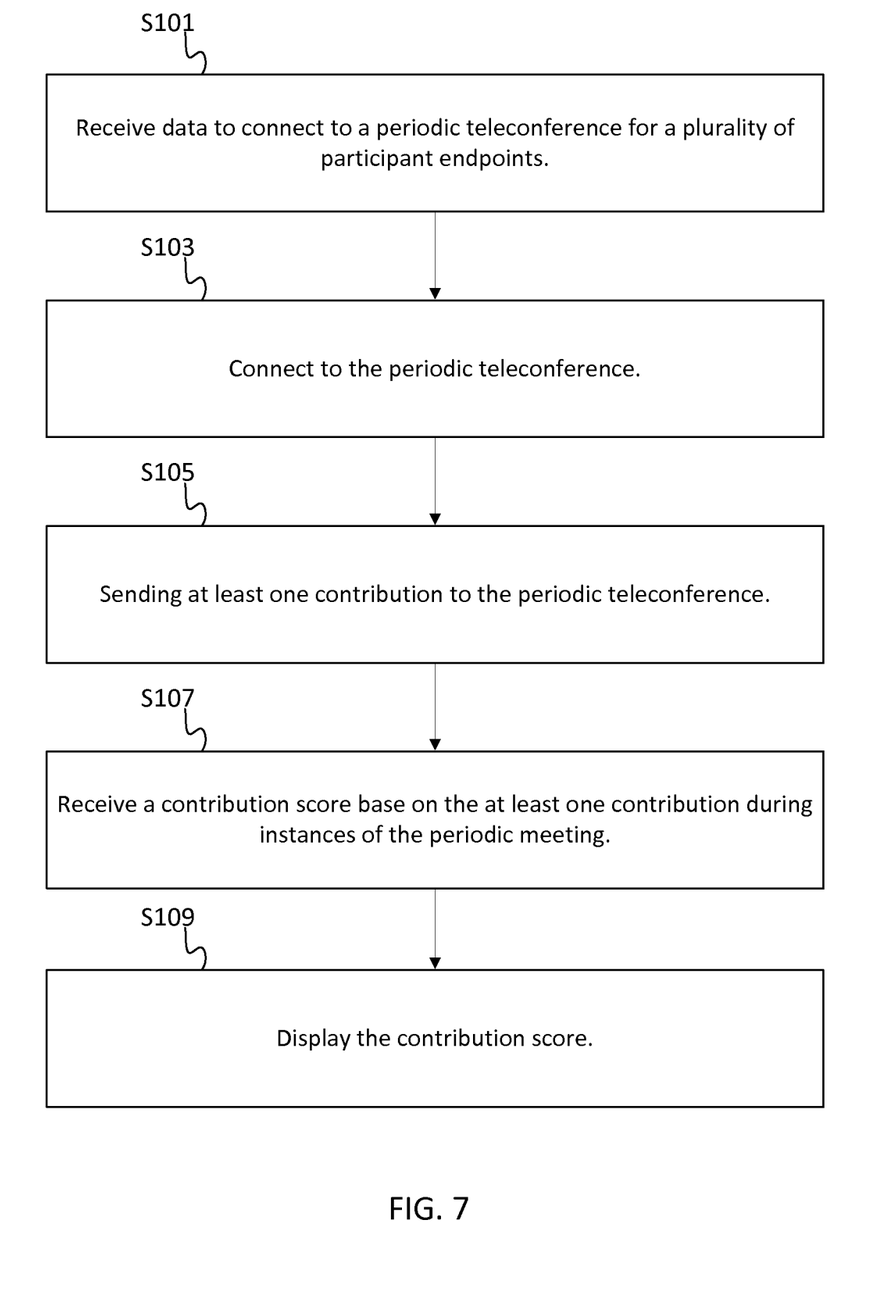
FIG. 7 illustrates an example flowchart for the endpoint device of FIG. 6.

FIG. 6 illustrates an example endpoint device 103 for the systems of FIG. 1. The endpoint device 103 includes a controller 200, a memory 201, an input device 203, a communication interface 211 and a display 213. Additional, different, or fewer components may be provided. Different network devices may have the same or different arrangement of components. FIG. 7 illustrates an example flowchart for the endpoint device of FIG. 6. Additional, different, or fewer acts may be provided. The acts are performed in the order shown or other orders. The acts may also be repeated.

The controller 200 establishes an online meeting including the endpoint device 103. At act S101, the controller 200 may receive data to connect to a periodic teleconference from the server 105. The data may be an invitation including a point or URL for the online meeting.

At act S103, the controller 200 connects to the periodic teleconference. The controller 200 may supply a username and/or password that corresponds to the online meeting in order to connect to the online meeting. The periodic meeting, as well as act S101, may be repeated for multiple instances or dates of the periodic meeting. In one example, the controller 200 connects to a single meeting that is not part of a periodic teleconference.

At act S105, the controller 200 or the communication interface 211 may send at least one contribution during instances of the periodic teleconference. The contributions may be identified by contribution triggers. The contributions may be tracked by contribution trigger and the frequency of the occurrence of the contribution trigger. Example contributions include sharing documents, sharing desktop, sharing desktop, speaking out (e.g., as detected by the microphone included in the input device 203), sending text message, answering polls, or being present in the meeting for (or above) a certain percentage of total meeting time (e.g. 80%), or selecting a raising hand option to request to contribute to the online meeting.

At act S107, the controller 200 or the communication interface 211 receives a contribution score base on the at least one contribution during instances of the periodic meeting. The contribution score may be calculated at the controller 200 or externally (e.g., at the server 105). At act S109, the controller 200 causes the display 213 to present the contribution score to the user.

The input device 203 may be one or more buttons, keypad, keyboard, mouse, stylus pen, trackball, rocker switch, touch pad, voice recognition circuit, or other device or component for inputting data to the access device 101. The input device 203 and the display 213 may be combined as a touch screen, which may be capacitive or resistive. The display 213 may be a liquid crystal display (LCD) panel, light emitting diode (LED) screen, thin film transistor screen, or another type of display. The display 213 is configured to display the first and second portions of the content.

Figure 8:
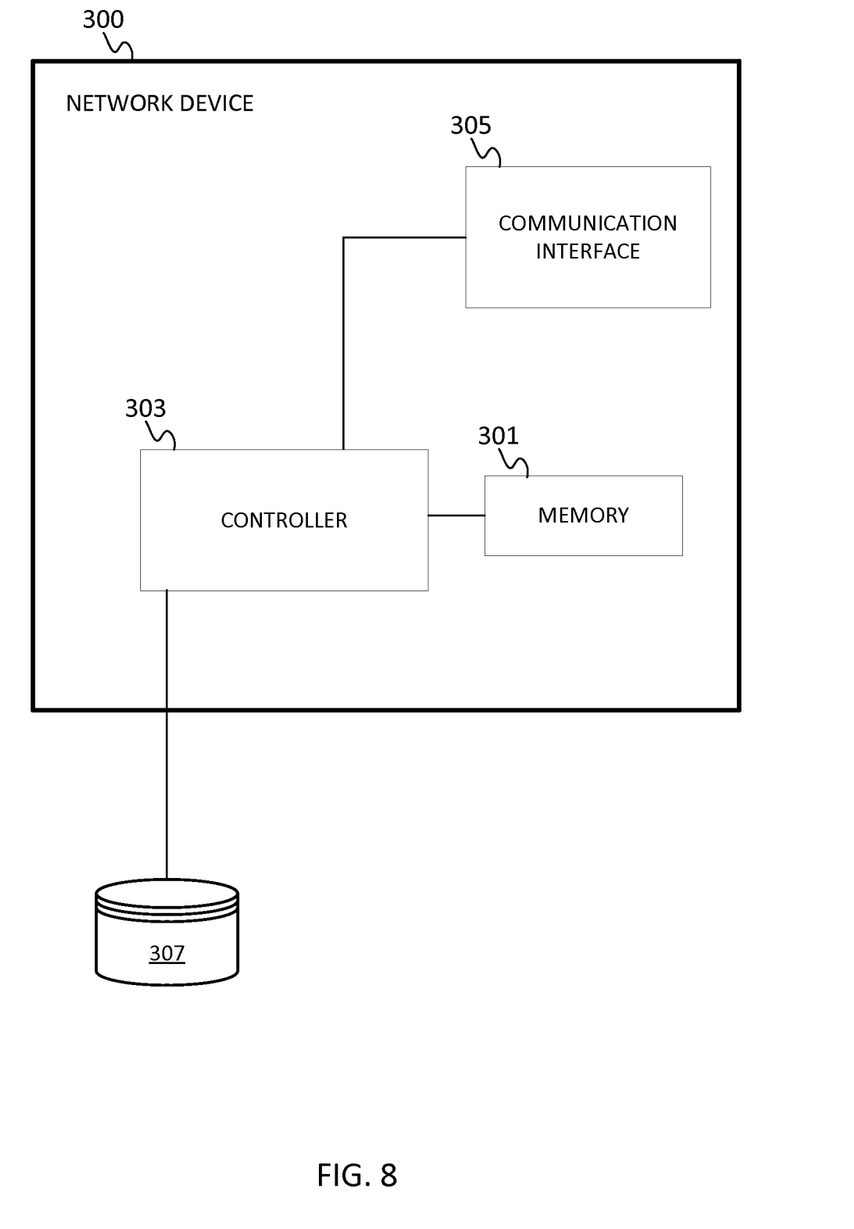
FIG. 8 illustrates an example network device for the system of FIG. 1.
Figure 9:
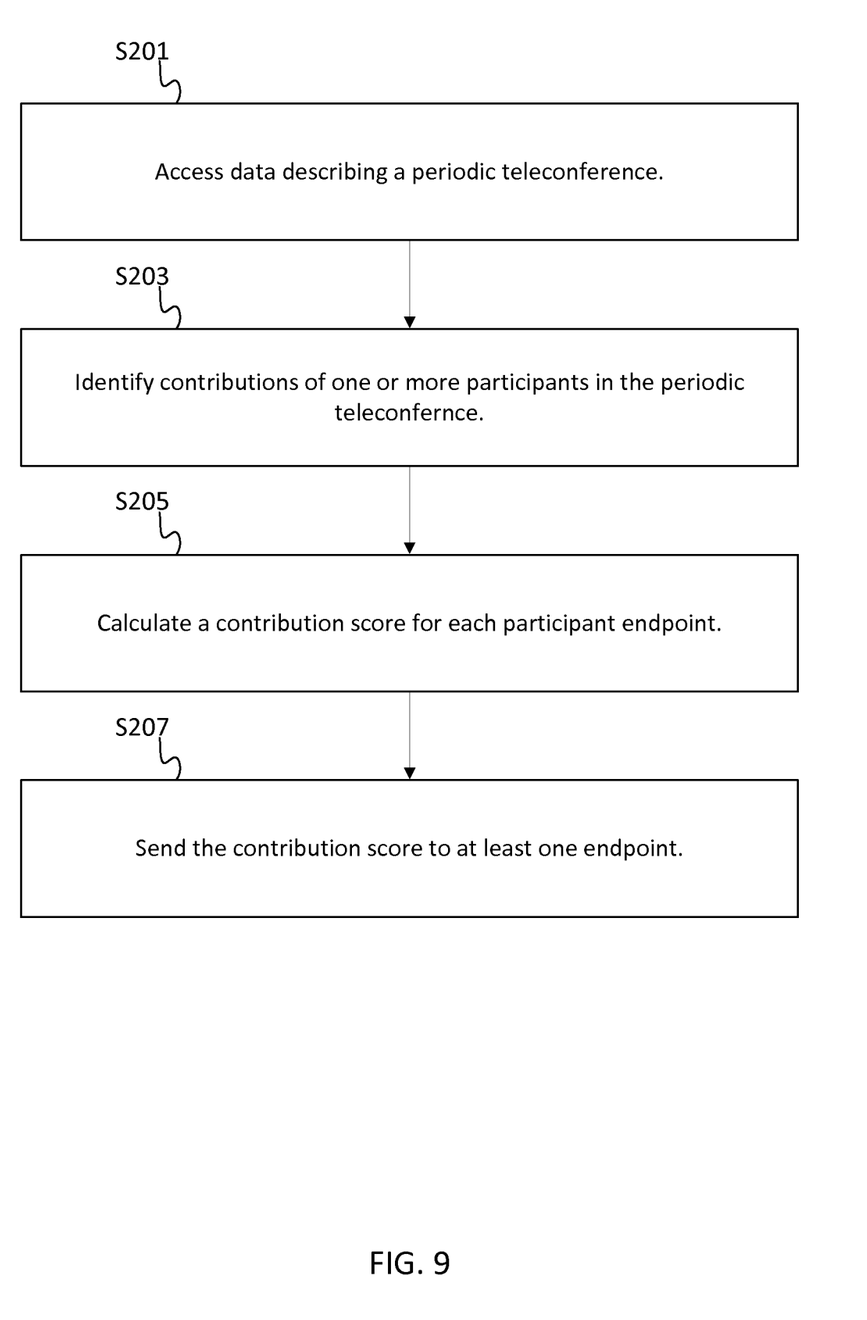
FIG. 9 illustrates an example flowchart for the network device of FIG. 8.

FIG. 8 illustrates an example network device (e.g., server 105) for the system of FIG. 1. The network device 300 includes at least a memory 301, a controller 303, and a communication interface 305. In one example, a database 307 stores the attendance information and contribution information (e.g., including tables 165 and 167). Additional, different, or fewer components may be provided. Different network devices may have the same or different arrangement of components. FIG. 9 illustrates an example flowchart for the network device of FIG. 8. Additional, different, or fewer acts may be provided. The acts are performed in the order shown or other orders. The acts may also be repeated.

At act S201, the controller 303 accesses data describing a periodic teleconference for multiple participant endpoints on multiple dates from memory 301 or database 307. The data may describe a meeting ID for the periodic teleconference, and an instance ID for the individual instance of the periodic meeting. The data may include a list of possible participants for each meeting instance and a list of actual participants for each instance that has already occurred. The data may also include contributions may by one or more participant endpoints.

At act S203, the controller 303 may identify contributions of at least one of the plurality of participant endpoints from the data describing the periodic teleconference. The contributions may be any combination of the contributions described in earlier examples.

At act S205, the controller 303 may calculate a contribution score for each participant endpoint. The contribution score may be a function of the type of contribution, the duration of the contribution, or the number of occurrences of contributions. Subsequent contributions may be given lower weights for increasing the contribution score according to a decay factor. The controller may also calculate an attendance score for each participant endpoint based on the number of meetings attended by each endpoint and/or the duration of each meeting that the endpoint is present.

At act S207, the controller 303 or the communication interface 305 sends the contribution score and/or the attendance score to at least one of the endpoints. In one example, the scores for each endpoint are sent to that endpoint. In another example, the scores for all endpoints are sent to all endpoints. In another example, scores are only sent to an administrator of the periodic meeting. The scores may be sent in response to requests received from the endpoint.

The recipient of the contribution scores and attendance scores may be defined by a permission lookup table stored in the memory 301. The permission lookup table may include permission codes that define whether each endpoint has permission to receive its own scores and whether each endpoint has permission to receive scores for other endpoints.

The controllers 200 and 303 may include a general processor, digital signal processor, an application specific integrated circuit (ASIC), field programmable gate array (FPGA), analog circuit, digital circuit, combinations thereof, or other now known or later developed processor. The controllers 200 and 303 may be a single device or combinations of devices, such as associated with a network, distributed processing, or cloud computing.

The memories 201 and 301 may be a volatile memory or a non-volatile memory. The memories 201 and 301 may include one or more of a read only memory (ROM), random access memory (RAM), a flash memory, an electronic erasable program read only memory (EEPROM), or other type of memory. The memories 201 and 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   identifying a periodic teleconference for a plurality of participant endpoints connected through a host server, wherein the periodic teleconference is associated with multiple dates;
   identifying attendance of the plurality of participant endpoints for the periodic teleconference on multiple dates;
   identifying a plurality of teleconference contributions of at least one of the plurality of participant endpoints for the periodic teleconference on multiple dates, wherein the plurality of teleconference contributions include at least one major contribution and at least one minor contribution;
   calculating a contribution score based on the plurality of teleconference contributions of the plurality of participant endpoints for the periodic teleconference on multiple dates; and
   generating, by a processor, a summary of the periodic teleconference including data indicative of the attendance of the plurality of participant endpoints and the plurality of teleconference contributions of the plurality of participant endpoints; and storing the summary of the periodic teleconference at the host server.

2. The method of claim 1, further comprising:
   identifying additional contributions of at least one of the plurality of participant endpoints; and
   updating the summary of the periodic teleconference based on the additional contributions.

3. The method of claim 1, wherein the plurality of teleconference contributions include speech, desktop sharing, text messages, or raising hand.

4. The method of claim 1, further comprising:
   ranking the plurality of plurality of participant endpoints based on respective contribution scores.

5. The method of claim 1, further comprising:
   generating a warning message based on the contribution score, wherein the warning message alerts at least one of the participant endpoints of a low contribution score.

6. The method of claim 1, further comprising:
   comparing contribution scores for the plurality of participant endpoints to a threshold value; and
   removing participant endpoints from future occurrences of the periodic teleconference with contribution scores below the threshold value.

7. The method of claim 1, wherein the periodic teleconference includes classes for an online course.

8. The method of claim 1, further comprising:
   sending the summary of the periodic teleconference to an administrator of the periodic teleconference.

9. The method of claim 1, further comprising:
   calculating interest levels of the plurality of participant endpoints in individual topics based on the attendance and the plurality of teleconference contributions of the plurality of participant endpoints.

10. The method of claim 1, wherein the attendance of the plurality of participant endpoints including multiple join times and leave times for one occurrence of the periodic teleconference.

11. An apparatus comprising:
    a memory configured to store data describing a periodic teleconference for a plurality of participant endpoints connected to a host server on multiple dates; and
    a processor configured to identify contributions of at least one of the plurality of participant endpoints from the data describing the periodic teleconference on multiple dates, wherein the contributions include at least one major contribution and at least one minor contribution, the processor configured to calculate a contribution score across multiple instances of the periodic teleconference for the at least one of the plurality of participant endpoints, wherein the contributions score is based on the minor contribution of speech and the major contribution of desktop sharing transmitted to others of the plurality of participant endpoints through the host server.

12. The apparatus of claim 11, further comprising:
a communication interface configured to receive a request for a summary of a periodic teleconference and send the summary of the periodic teleconference including the contribution score in response to the request.

13. The apparatus of claim 12, wherein the request includes a permission code for verifying access to the summary of the periodic teleconference.

14. The apparatus of claim 11, wherein the processor configured to identify attendance of the at least one of the plurality of participant endpoints from the data describing the periodic teleconference on multiple dates and calculate an attendance score across multiple instances of the periodic teleconference for the at least one of the plurality of participant endpoints.

15. The apparatus of claim 11, wherein varying weights are assigned to two or more of the contributions.

16. The apparatus of claim 11, wherein a decay factor is applied to subsequent contributions of a same type when calculating the contribution score.

17. A non-transitory computer readable medium including instructions that when executed are configured to cause a processer to:
receiving data to connect to a host server and a periodic teleconference for a plurality of participant endpoints, wherein the periodic teleconference is associated with multiple dates;
sending at least one major contribution and at least one minor contribution for others of the plurality of participant endpoints to the host server during instances of the periodic teleconference; and
receiving a contribution score from the host server base on the at least one major contribution and at least one minor contribution during instances of the periodic teleconference.

18. The non-transitory computer readable medium of claim 17, wherein the at least one major contribution includes speaking and sharing materials during the periodic teleconference.

19. The method of claim 1, wherein the plurality of teleconference contributions include desktop sharing sent to the plurality of participant endpoints through the host server.

* * * * *